United States Patent
Ahern et al.

(10) Patent No.: US 8,668,136 B2
(45) Date of Patent: Mar. 11, 2014

(54) METHOD AND SYSTEM FOR RFID-ASSISTED IMAGING

(75) Inventors: Brian Ahern, Westwood, MA (US); Bernd Schoner, Cambridge, MA (US)

(73) Assignee: Trimble Navigation Limited, Sunnyvale, CA (US)

( * ) Notice: Subject to any disclaimer, the term of this patent is extended or adjusted under 35 U.S.C. 154(b) by 28 days.

(21) Appl. No.: 13/410,084

(22) Filed: Mar. 1, 2012

(65) Prior Publication Data

US 2013/0228620 A1 Sep. 5, 2013

(51) Int. Cl.
  *G06F 17/00* (2006.01)
(52) U.S. Cl.
  USPC ......................................................... 235/375
(58) Field of Classification Search
  USPC ......................................................... 235/375
  See application file for complete search history.

(56) References Cited

U.S. PATENT DOCUMENTS

| | | | |
|---|---|---|---|
| 6,397,334 B1 | 5/2002 | Chainer et al. | |
| 2005/0258939 | 11/2005 | Kantrowitz | |
| 2002/0008622 A1 | 1/2002 | Weston et al. | |
| 2004/0156535 A1 | 8/2004 | Goldberg et al. | |
| 2006/0028552 A1 | 2/2006 | Aggarwal et al. | |
| 2007/0103566 A1 | 5/2007 | Aerrabotu et al. | |
| 2009/0049004 A1* | 2/2009 | Nurminen et al. | 707/1 |
| 2009/0175499 A1* | 7/2009 | Rosenblatt | 382/103 |
| 2009/0220145 A1 | 9/2009 | Ootani et al. | |
| 2009/0224045 A1 | 9/2009 | Toda et al. | |
| 2009/0315678 A1 | 12/2009 | Padmanabhan et al. | |
| 2010/0039500 A1 | 2/2010 | Bell et al. | |
| 2011/0024500 A1 | 2/2011 | McReynolds et al. | |
| 2011/0150348 A1* | 6/2011 | Anderson | 382/224 |
| 2012/0068813 A1* | 3/2012 | Karttaavi et al. | 340/5.2 |

FOREIGN PATENT DOCUMENTS

| DE | 10 2006 046963 A1 | 10/2007 |
|---|---|---|
| JP | 2006 268747 A | 10/2006 |
| WO | 2009/073790 A2 | 6/2009 |

OTHER PUBLICATIONS

International Search Report and Written Opinion for PCT Application No. PCT/US2013/027752, mailed on Jun. 27, 2013, 17 pages.

* cited by examiner

*Primary Examiner* — Christle Marshall
(74) *Attorney, Agent, or Firm* — Kilpatrick Townsend & Stockton, LLP

(57) ABSTRACT

A method includes acquiring imaging data of a scene using an imaging tool. The method also includes extracting radio frequency identification (RFID) data stored in an RFID tag associated with the scene. The method further includes associating the RFID data with the imaging data.

59 Claims, 8 Drawing Sheets

METHOD AND SYSTEM FOR RFID-ASSISTED IMAGING

BACKGROUND OF THE INVENTION

Three-dimensional and two-dimensional imaging tools, such as laser scanners and cameras, measure in an automatic way a large number of points on the surface of an object, and often output a point cloud as a data file. Such imaging tools are useful for capturing visual information of an environment or a facility, and are widely used in construction industry, civil engineering, and asset management, among other applications. For some applications, such as asset management, it is often desirable to integrate asset information with visual information. For example, an operator viewing a scanned image of a plant may want to view the asset information related to a particular asset appearing in the scanned image. The asset information may include, for example, manufacturer's name, model number, specifications, computer-added design (CAD) model, maintenance history, and the like. Conversely, an operator viewing a list of assets may want to see where a particular asset is located in the plant from the scanned image. For some other applications, it may be desirable to create CAD models of the objects captured by an imaging tool. There is currently a lack of efficient ways of linking asset information with visual information.

Thus, there is a need in the art for a method and system for automatically or semi-automatically identifying objects from images acquired by an imaging tool and associating asset information about the identified objects with the images.

SUMMARY OF THE INVENTION

The present invention relates generally to a method and system for RFID-assisted imaging. More particularly, embodiments of the present invention relate to acquiring imaging data of an object using an imaging tool and detecting an RFID tag associated with the object using an RFID reader. RFID data extracted from the RFID tag is associated with the imaging data and stored as metadata along with the imaging data. The invention has wider applicability than this example and other applications are included within the scope of the present invention.

According to an embodiment of the present invention, a method is provided. The method includes acquiring imaging data of a scene using an imaging tool and extracting radio frequency identification (RFID) data stored in an RFID tag associated with the scene. The method also includes associating the RFID data with the imaging data.

According to another embodiment of the present invention, a system is provided. The system includes an imaging tool operable to acquire imaging data of a scene an RFID reader operable to extract RFID data stored in an RFID tag associated with the scene.

According to a specific embodiment of the present invention, a method of collecting information is provided. The method includes acquiring imaging data of a plurality of objects using an imaging tool and for at least one object of the plurality of objects: extracting RFID data stored in an RFID tag; creating an image representation of a scene including the at least one object from the imaging data; and associating the RFID data with the image representation.

According to another specific embodiment of the present invention, a method of constructing a 3D point cloud is provided. The method includes obtaining a first image including at least a scene from a first perspective. The first image includes an optical marker.

The method also includes receiving RFID data from an RFID tag associated with the optical marker and identifying a physical location associated with the optical marker using the RFID data. The method further includes obtaining a second image including at least the scene from a second perspective. The second image includes the optical marker. Additionally, the method includes constructing the 3D point cloud using the first image and the second image.

Numerous benefits are achieved by way of the present invention over conventional techniques. For example, embodiments of the present invention provide methods and systems for automatic identification of assets included in an image, for example, equipment in a plant. Utilizing the data rich environment made possible using RFID tags, point clouds generated using imaging systems can be augmented to include data related to the various objects present in an environment. Additionally, embodiments of the present invention provide systems that reduce or eliminate errors during data transfer since a reduction in the amount of operator inputs utilized results in a reduction or elimination of mistakes. In other embodiments, a display system is provided in which no or a limited amount of text is superimposed over an image, resulting in limited or no obscuring of the image. Moreover, in some embodiments, relevant information is stored in an image or EXIF file, reducing the need for separate documentation and reducing the likelihood of the loss of important information.

Embodiments of the present invention provide for a significant increase in the amount of information that can be stored through the use of RFID tags, thereby providing many details about the image subject, for example, many more details than could be appended to the image by writing on the image. Additionally, an embodiment of the present invention may be applied with great utility for First Responders in terms of aiding them with information about a particular location or building. As an example, a library of aerial or street view images, localized to a predetermined distance range may be constructed, for instance, by city block, may be configured with RFID tags indicating ownership of the structures, type of building permits for building use, and the like. Information normally stored in city records may be transferred to a building tag describing special building contents, including, for example, hazardous material notices. Furthermore, data stored on RFID tags may be encrypted to prevent detection/decoding by unauthorized personnel. It should be noted that the data creation function used to create a suitable RFID tag is independent of the image capture methods or systems. Thus, RFID data can be added to any image at any time, contemporaneously or subsequently, during the creation of either the RFID tag or during an image capture process.

Moreover, some embodiments allow the faster post-processing of acquired images, allow for the extraction of meaningful data from point clouds, allow for the extraction of relevant object data in the field, allow for closed-loop data acquisition, allow for efficient parsing of large image databases, allow for targeted image acquisition over the lifetime of an object, and the like. These and other embodiments of the invention along with many of its advantages and features are described in more detail in conjunction with the text below and attached figures.

DETAILED DESCRIPTION OF SPECIFIC EMBODIMENTS

Embodiments of the present invention relate to methods and systems for RFID-assisted imaging. More particularly, embodiments of the present invention relate to acquiring imaging data of an object using an imaging tool and detecting an RFID tag associated with the object using an RFID reader. RFID data extracted from the RFID tag is associated with the imaging data and stored as metadata along with the imaging data. Merely by way of example, the invention has been applied to forming an intelligent 3D model of a facility using imaging and RFID data.

Figure 1:
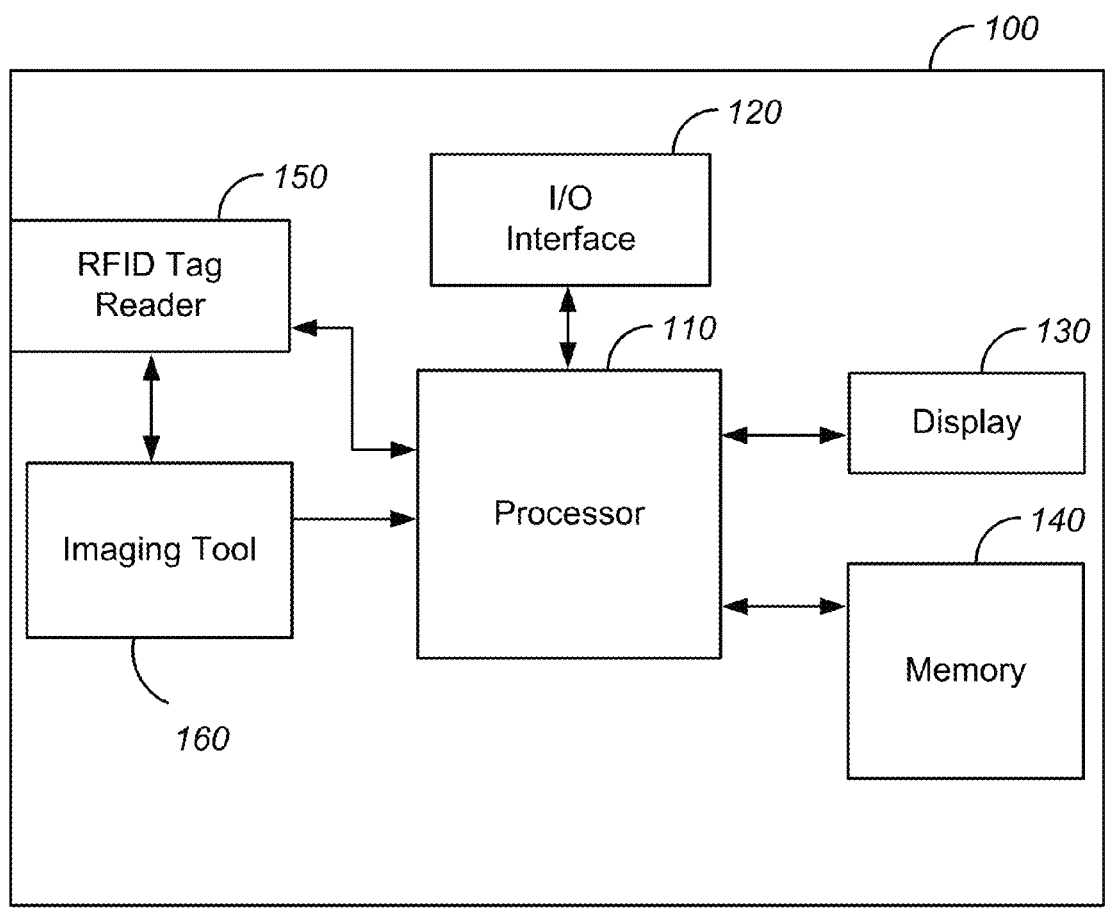
FIG. 1 is a simplified block diagram of an RFID-assisted imaging system according to an embodiment of the invention.

FIG. 1 is a simplified block diagram of RFID-assisted imaging system 100 that includes imaging tool 160 and RFID tag reader 150 according to one or more embodiments of the invention. The imaging tool 160 can be a camera, a stereoscopic camera, a laser scanner, a photogrammetric system, a 3-D scanner, an optical total station, a consumer-grade camera, a mobile spatial camera, such as is used for mobile data capture in outdoor and indoor scenes, or the like. Data collected by the imaging tool can be provided to processor 110 for image processing, storage in memory 130, or the like. In some embodiments, the imaging tool is a video camera, a still camera, a thermal camera, or the like. The image data or processed versions of the image data can be displayed on display 130, for example, an LCD screen or other suitable display that can be integrated with the RFID-assisted imaging system 100. Using the imaging tool 160, a 3D model (which can be referred to as a point cloud) can be generated for use by the system. It should be noted that embodiments of the present invention are not limited to the use of 3D models or point clouds, but are applicable to a wide range of image representations. As an example, a digital image captured using a camera may be suitable for use in a number of application areas since it includes digital data.

RFID tag reader 150 is configured to detect an RFID tag (not shown) associated with an object being imaged by the imaging tool 160. RFID tag reader 150 is further configured to extract RFID data stored in the RFID tag. According to some embodiments, each of imaging tool 160 and RFID tag reader 150 is coupled to processor 110. Processor 110 is configured to receive RFID data and imaging data from RFID tag reader 150 and imaging tool 160, respectively. Processor 110 is further configured to associate RFID data with imaging data. Processor 110 can output imaging data and RFID data using an I/O interface 120. The I-O interface 120 enables a user or a remote system to interact with the RFID-assisted imaging system 100, for example, providing control inputs, receiving image and/or RFID data from the system, controlling the operation of the imaging tool, providing data that is stored in RFID tags, or the like. One of ordinary skill in the art would recognize many variations, modifications, and alternatives.

As described throughout the present specification, RFID tags are placed on assets or associated with assets that are present in a 3D point cloud. Using the data provided by the RFID tags, the assets in the 3D point cloud can be automatically or semi-automatically identified, catalogued, and converted into elements in a 3D CAD model. In some embodiments, the RFID tags are not mounted on the asset, but associated with the asset, for example, by utilizing an optical marker mounted on the asset that is associated with an RFID tag including information related to the asset. Additional detail regarding these methods and systems is provided herein.

According to embodiments of the present invention, the processor 110 can be any type of processor such as a microprocessor, field programmable gate array (FPGA) and/or application specific integrated circuit (ASIC). In other embodiments, the processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the RFID-assisted imaging system 100 that controls the operation of the entire system. Although not depicted in FIG. 1, the processor 110 typically includes a control unit that organizes data and program storage in memory and transfers data and other information between the various parts of the system. The processor 110 is operable to receive input data from the various system components, read and stores code and data in memory 140, and present data to and receive data from the I/O interface 120.

Imaging data, RFID data, and composite data generated from these and other sources can be stored in memory 140. Data received and/or processed by the processor 110 can be stored by memory 140, which represents one or more mechanisms for storing data. The memory 140 may include read-only memory (ROM), random access memory (RAM), magnetic disk storage media, optical storage media, flash memory devices, and/or other machine-readable media. In other embodiments, any appropriate type of storage device may be used. Although only one memory 140 is shown, multiple storage devices and multiple types of storage devices may be present. In some embodiments, one or more metadata tags are stored in association with the imaging data (e.g., in an image data file including imaging data from a scene). The metadata tag specifies a particular RFID tag file and given the image data file, the RFID tag data is extracted. In an alternative embodiment, a metadata tag could be stored in RFID data with a reference to a particular image data file. Thus, the RFID data can be associated with the imaging data and is, therefore, retrievable via the association with the imaging data. Alternatively, the RFID data can includes a metadata tag associated with the imaging data and image data can be retrieved using the metadata tag. One of ordinary skill in the art would recognize many variations, modifications, and alternatives.

The memory 140 includes a controller (not shown in FIG. 1) and data items. The controller includes instructions capable of being executed on the processor 110 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the memory 140 may also contain additional software and data (not shown), which is not necessary to understand the invention. Data received and processed by the processor can be displayed using input/output interface 130, which may include a user interface for receiving and displaying data, images, and the like. Additionally, it will be appreciated that imaging data and RFID data may be presented to a user through display 130.

When implemented in software, the elements of the invention are essentially the code segments to perform the necessary tasks. The program or code segments can be stored in a non-transitory processor-readable medium. The processor-readable medium, also referred to as a computer-readable medium may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, etc. The code segments may be downloaded via computer networks such as the Internet, Intranet, etc.

Figure 2A:
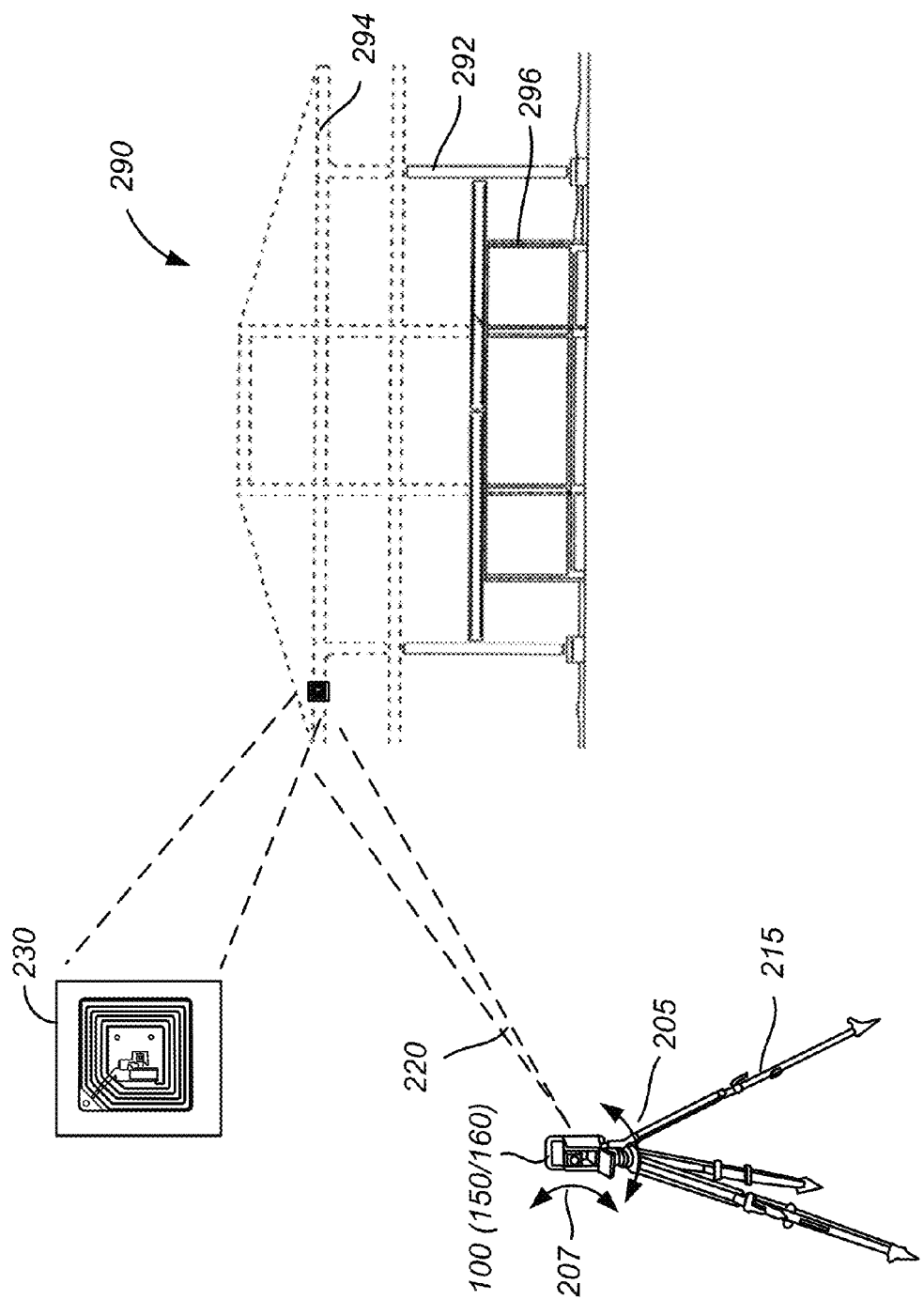
FIGS. 2A-2B are simplified schematic diagrams illustrating use of an RFID-assisted imaging system according to embodiments of the invention.
Figure 2B:
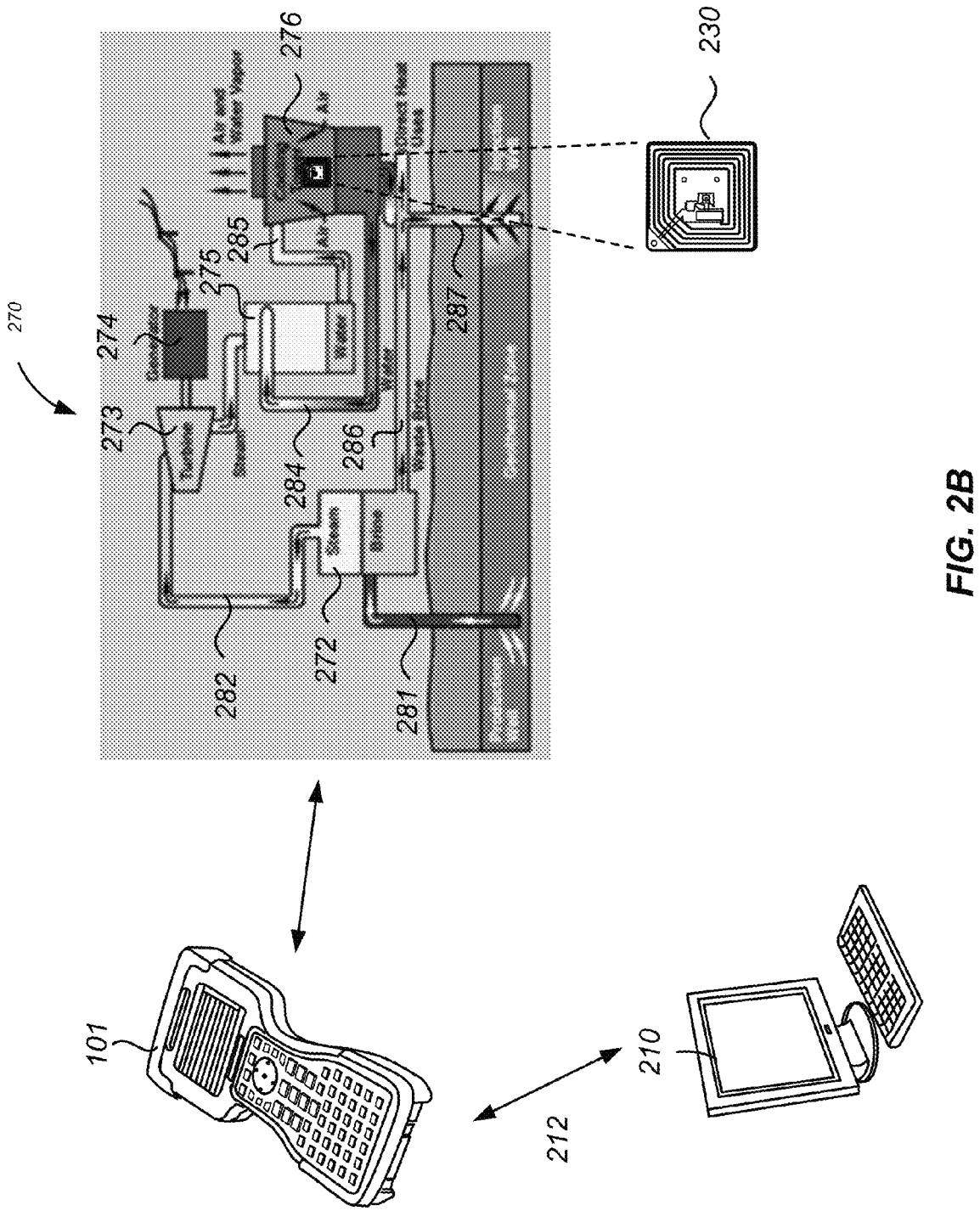

FIGS. 2A-2B are simplified schematic diagrams illustrating use of an RFID-assisted imaging system according to embodiments of the invention. As illustrated in these figures, graphical representations of the RFID-assisted imaging system 100 of FIG. 1 are shown according to one or more embodiments of the invention. Referring to FIG. 2A, RFID-assisted imaging system 100 includes a co-located imaging tool and RFID tag reader, which are mounted on a tripod 215. Merely by way of example, imaging tool 160 may be configured such that it can rotate up to 360° in the horizontal plane 205 and up to about 360° in the vertical plane 207 (e.g.,.) 270°, so that an entire scene surrounding the imaging tool 160 may be imaged. In other embodiments, the rotation in the vertical plane 207 can be a different angle as appropriate to the particular application. Thus, it should be appreciated that other angular ranges may be utilized in other embodiments. According to an embodiment, the imaging tool utilized in system 100 has a first field of view 220 such that a first section of the scene within the first field of view 220 may be imaged at a first time.

The RFID tag reader associated with the imaging device may or may not rotate along with the imager. In some embodiments the RFID reader uses multiple antennas to provide electromagnetic coverage. In some embodiments, the reader antenna elements are rotating to cover specific areas of a space with electromagnetic energy. In yet other embodiments, the RFID reader uses phased array antennas to electrically control the field over which signals are read.

In another embodiment, the system is used during the scanning process to more efficiently acquire visual data. In a simplified version, a cameraman may carry the imager through the space until the system detects the RFID tag associated with the object to be scanned. The cameraman would then focus his or her activity on only the object or scene ultimately relevant.

In another embodiment, the system is used to efficiently process imaging data associated with an object and neglect some or all other imaging data. At the time that images of an object become relevant, be it for maintenance reasons or for reasons of processing a change order. The data base can be queried to produce all the images associated with a particular RFID tag and hence a particular scene or object. This makes it much easier for an operator to parse through the limited set of data.

According to an embodiment of the invention, the imaging tool comprises one or more cameras configured to capture two-dimensional or three-dimensional images. According to another embodiment of the invention, the imaging tool comprises a two-dimensional or three-dimensional scanner. Scanners are analogous to cameras in some respects. Like cameras, they have a cone-like field of view. A scanner collects distance information about surfaces within its field of view. The image produced by a scanner describes the distance to a surface at each point in the image. This allows the position of each point in the image to be identified.

According to another embodiment, the imaging tool comprises a time-of-flight laser scanner that includes a laser rangefinder. The laser rangefinder finds the distance of a surface by timing the round-trip time of a pulse of laser light. Typically, the laser rangefinder detects the distance of one point in its field of view at any given time. Thus, the scanner scans its entire field of view one point at a time by changing the rangefinder's direction of view to scan different points. According to embodiments of the present invention, the view direction of the laser rangefinder is changed by rotating the rangefinder itself or by using a system of rotating mirrors. According to another embodiment, the imaging tool comprises a triangulation laser scanner. A triangulation laser scanner may shine a laser on an object and exploit a camera to look for the location of the laser dot. Depending on how far away the laser strikes a surface, the laser dot appears at different places in the camera's field of view. According to yet another embodiment, the imaging tool comprises a hand-held laser scanner using the triangulation mechanism described above. It may also be appreciated that imaging tool may comprise other types of scanners or cameras. One of ordinary skill in the art would recognize many variations, modifications, and alternatives.

The purpose of a three-dimensional imaging tool is usually to create a point cloud of geometric samples on the surface of an object. A point cloud is a set of vertices in a three-dimensional coordinate system. These vertices are usually defined by X, Y, and Z coordinates. These points can then be used to extrapolate the shape of the object. For most situations, a single scan is not able to produce a complete model of an object. Multiple scans, taken from at least two different perspectives, are usually utilized to obtain information about all sides of the object. These scans are then brought into a common reference system, a process that is usually called alignment or registration, and then merged to create a complete point cloud. The entire process, going from individual scans to a point cloud, is usually referred to as three-dimensional scanning pipeline. Although some scanning systems provide a 3D point cloud, for example, for a facility or plant, merely pixel information is provided, not information related to the items or assets represented by the 3D point cloud. Accordingly, conversion processes are utilized to convert the 3D point cloud into a CAD model. In a specific implementation, a single scan is used to create a point cloud. In another specific implementation, multiple scans are referenced and merged to create a larger point cloud of an object or project area, enabling the capture of a whole object. The point cloud can include data related to the intensity of the return signal, spectral (e.g., RGB and/or IR) data, or the like.

Merely by way of example, FIG. 2A depicts an example in which RFID-assisted imaging system 100 images a building 290. Building 290 may be constructed from structural parts, such as columns 292, beams 294, and frames 296. As an example, one or more of the structural parts may be fabricated off-site and then bolted or welded together during construction using connection plates. According to an embodiment, one or more of the structural parts may have one or more RFID tags 230 associated with the structural parts. According to an embodiment, the RFID tags are attached to their respective items by their manufacturers, vendors, and the like, and are in place when the structural parts are received and the building is constructed. According to an embodiment of the invention, the value of the RFID tags is leveraged later during the lifecycle of the building. In other embodiments, the RFID tags are added after construction is partially or fully completed. One of ordinary skill in the art would recognize many variations, modifications, and alternatives.

According to embodiments of the present invention, each RFID tag may be a passive RFID tag, an active RFID tag, a battery-assisted passive RFID tag, or combinations thereof. Each RFID tag includes an antenna for receiving and transmitting signals. Each RFID tag further includes circuitry for storing and processing information. As shown in FIG. 2A, RFID tag 230 is depicted as including an antenna and a processor/memory. However, it may also be appreciated that RFID tag 230 can be any type of RFID tag. The RFID tag can be embedded in a target used for aligning the images.

According to embodiments of the invention, RFID tags may have various storage capacities. The following table provides exemplary values of the maximum number of characters which can be encoded by each RFID tag according to embodiments of the invention. While the values presented relate to an exemplary maximum number of characters encoded by RFID tag data, it may be appreciated that each RFID tag may be decoded with less characters.

| RFID TAG CAPACITY (EXEMPLARY) | |
| --- | --- |
| Numeric | 7,089 characters |
| Alphanumeric | 4,296 characters |
| Binary (8 bits) | 2,953 characters |
| Kanji, full-width Kana | 1,817 characters |

According to an embodiment of the invention, data encoded in an RFID tag may include only an identification number for the item. This type of RFID tags is often referred to as license-plate RFID tags. For these license-plate RFID tags, the tag includes a reference number for an asset and the reference number points to an entry in a database that provides the desired information about the asset. For example, a pipe in a facility can be assigned a unique number that is stored in the license plate RFID tag. When the pipe is scanned using the RFID tag reader, the unique number can be used to find information in the database including, without limitation, manufacturing date, installation date, pipe specifications, maintenance information, modifications made to the pipe, a CAD model reference, and the like. In some implementations, the RFID tag reader thus only obtains a reference number, which is then used in post-processing to obtain additional information about the asset or correlation of the asset with the point cloud.

According to another embodiment, data encoded in an RFID tag may include high level information suitable for storage in an RFID tag with substantial memory. Such high level information may include, for example and without limitation, manufacturer's name, model number, specifications, CAD model information, maintenance history, and the like. The high level information provided by the RFID tag can be supplemented with data from one or more databases, including a manufacturer's database accessible over a public or a private network. In some embodiments, the RFID tag is both readable and writable, enabling new information or updated information to be stored in the RFID tags. In these embodiments, the RFID tag reader may also function as an RFID tag writer. One of ordinary skill in the art would recognize many variations, modifications, and alternatives.

According to embodiments of the present invention, the RFID tag reader included in the RFID-assisted imaging system 100 is configured to detect the RFID tags associated with the objects being imaged by the imaging tool. In an embodiment, the RFID tag reader further decodes the RFID data stored in the detected RFID tags and transmits the RFID data to one or more processors and/or one or more memories. According to an embodiment, the processor may use the RFID data to identify the objects being imaged by imaging tool. According to another embodiment, the processor may associate the RFID data with the imaging data acquired by the imaging tool. The RFID data may be stored as metadata along with the imaging data and may be queried later. In the case of license-plate RFID tags, the processor may link the identification numbers extracted from the detected RFID tags with an asset database that contains asset information about the items. The asset information may be retrieved later in reference to the identifications numbers. Although some implementations are described in relation to detecting an RFID tag and then extracting RFID data, embodiments of the present invention are not limited to these implementations. Moreover, the function of combining RFID data with imaging data can be performed contemporaneously, before imaging or extraction of RFID data, or after image capture. As an example, embodiments of the present invention can be implemented while a structure is being built since some embodiments have access to data files associated with building information management (BIM) systems. Thus, the data can be added during the building process, before, during, or after an image is taken.

According to embodiments of the present invention, the RFID tag reader includes one or more antennas for transmitting and receiving radio frequency (RF) signals to detect RFID tags and to receive information stored in the detected RFID tags. In some implementations, the RFID antenna focuses radio energy from the RFID tag reader in a narrow beam. In these implementations, the RFID tags within the antenna's beam width, also referred to herein as the antenna's field of view, are detected. An antenna's field of view is typically related to the gain of the antenna. The higher the gain, the farther the antenna can "see." Additionally, the antenna can typically be used at larger ranges as the field of view is narrowed. For an antenna with a gain of about 6 dB, a typical field of view is approximately 30°. Merely by way of example, the RFID tag reader utilized in embodiments of the present invention may have a distance range ranging from about 1 m to about 20 m, depending on the frequency of the radio waves used and the types of RFID tags (e.g., passive or battery-assisted). In other embodiments, the distance rage associated with both the imaging tool and the RFID tag reader can be varied to smaller distances or larger distances as appropriate to the particular applications. As an example, battery-enhanced RFID tags can be read at distances up to and exceeding 60 m. In industrial environment, the majority of assets are within a distance of 20 m, providing a large number of facilities for which embodiments of the present invention are suitable for use. Thus, a variety of suitable RFID tags can be utilized depending on the particular application.

According to an embodiment, the RFID tag reader utilizes an antenna with a field of view that substantially coincides with the field of view of the imaging tool, so that unique association of image data with RFID data can be made. According to embodiments of the present invention, the field of view of the RFID antenna may be adjusted dynamically or statically to enable such unique association between the image and the RFID tag data acquired. According to an embodiment, the antenna is configured such that it can be rotated in a synchronized manner with the imaging tool so that the RFID tag reader detects RFID tags in the current field of view of the imaging tool.

According to another embodiment, the RFID tag reader includes multiple antennas, with each antenna fixed so that it has a respective field of view. As the imaging tool scans a scene, various antennas are turned on one at a time according to the current field of view of the imaging tool in these implementations. According to yet another embodiment, the RFID tag reader includes multiple antennas, with each antenna having a respective vertical field of view that is fixed with respect to the vertical plane 207. The various antennas are turned on one at a time, and the entire antenna assembly is rotated in the horizontal plane 205 in a synchronized manner with the imaging tool, such that the RFID tag reader detects RFID tags in the current field of view of the imaging tool. In other embodiments, hardware/software is used to activate antennas that have a field of view that is aligned with the directionality of the imaging tool. It should be appreciated that other types of antenna configurations may be contemplated and the present invention is not limited to one of the particular configurations discussed herein. One of ordinary skill in the art will recognize many variations, modifications, and alternatives.

Referring now to FIG. 2B, RFID-assisted imaging system 100 of FIG. 1 is shown as a hand-held device 101 according to another embodiment of the invention. Here, the imaging tool and the RFID tag reader are co-located and housed in the hand-held device 101. In other embodiments, the hand-held device includes only the RFID reader and the imaging tool is provided separately. In this embodiment, the RFID tag reader can be used to detect an RFID tag in close proximity to the hand-held device 101. An operator may carry the hand-held device 101 and walk around a facility to scan the various RFID tags in the facility, providing this RFID information to central processor 210, which can then associate the RFID data with the image data, for example, in an algorithm performing the construction of the 3D point cloud. Thus, the hand-held device 101 can transmit imaging data and/or RFID data to a central processor 210 for data collection and processing over communications link 212. Communications link 212 may be a wired or wireless data link as appropriate to the particular implementation. Data collected by the hand-held device 101 can be stored locally, transmitted to the central processor 210, or a combination of these techniques can be utilized. In some embodiments, the hand-held device includes an interface that enables the operator to be provided with prompts to scan predetermined items, which can be graphically displayed, shown in an list, or the like. Thus, some implementations utilize an integrated imaging tool and RFID scanner and other embodiments separate these elements to provide independent sources of imaging and RFID data, which can then be merged in a post-processing environment. Additionally, systems described herein provide for both concurrent collection of imaging and RFID data as well as sequential collection of this data, with either imaging or RFID data collected first. It should be noted that post-processing can also be utilized as part of the processing function for an integrated system.

According to embodiments of the invention, the RFID-assisted imaging system 100 illustrated in FIG. 1 may be used in applications such as asset management for plants and facilities, including oil refineries, petrochemical plants, chemical plants, offshore rigs and platforms, land-based rig fields and production facilities, gas plants, manufacturing plants, power plants (including nuclear power plants, steam power plants, etc.), utility facilities, and the like. RFID-assisted imaging system 100 of FIG. 1 may also be used in other applications, such as inventory tracking, products tracking, building inspection and maintenance, as-built building information modeling (BIM) systems, tank inspection, public security (e.g., in airports, train stations, etc.), safety assurance in transportation devices (e.g., airplanes, fire trucks, ambulances, buses, etc.), and the like. It should be appreciated that the present invention is not limited to these particular applications. One of ordinary skill in the art would recognize many variations, modifications, and alternatives.

In another embodiment, the combination of imaging and RFID data is used to determine the as-built model of a facility previously constructed. In a typical construction scenario, the building is being put together based on BIM CAD models. Due to construction imperfection, mistakes, and material tolerances, the final building rarely exactly matches the CAD model. Using the imaging information along with the RFID Object data, the CAD models can be updated to reflect the building as it was actually built ("As-built model").

According to embodiments of the invention, the RFID-assisted imaging system 100 of FIG. 1 may be incorporated in mobile computing devices, including intrinsically safe RFID-enabled tablet personal computers, hand-held terminals, and the like. Such mobile computing devices may be used by facility owners, facility operators, service providers, and the like, while they are out in the field or in a facility. Moreover, the RFID-assisted imaging system 100 of FIG. 1 may be used in conjunction with other RFID-enabled solutions, such as RFID/GPS-enabled people tracking solutions.

In another embodiment, the RFID tags may also include location information in reference to the location of the RFID tag. For example, the RFID tag may be located in a very visible location, containing information about an object that is not visible, or only partially visible. In that scenario, the RFID tag may contain data that explains where the object is located in reference to the RFID tag.

In another embodiment, the RFID tag may also contain human readable or machine readable information. For example the RFID tag may contain a barcode that points to the same information as the number stored in the electronics of the RFID tag. As an other example, the RFID tag may have the asset ID or any other information written on the tag for reference.

In another embodiment, the RFID tag also serves as an optical marker for the imaging system. Complex imaging systems, such as 3D systems, in many applications relay on optical reference points to overlay different images of the same location. The RFID tag can be designed to provide such optical reference information. The RFID tag can also contain unique numbering information in order to uniquely identify a reference point. Such information can be used even if a long time passes between scans. It is furthermore possible to repeat the ID information by means of a barcode on the tag so that the optical information can match the optical ID with the electronic ID of the tag and hence associate all the additional information stored on the tag or in the database.

According to embodiments, elements of the invention may be implemented in software as code segments to perform the necessary tasks of linking RFID data with imaging data. The program or code segments can be stored in a non-transitory processor-readable medium. Such software may be used by facility owners, facility operators, service providers, and the like, for asset management, facility inspection and maintenance, and so on. It should be appreciated that the present invention is not limited to these particular applications. One of ordinary skill in the art would recognize many variations, modifications, and alternatives.

Merely by way of example, FIG. 2B depicts a set up where an RFID-assisted imaging system 100 as illustrated in FIG. 1 (i.e., hand-held device 101) collects data related to a steam power plant 270. Steam power plant 270 may include assets such as steam tank 272, turbine engine 273, generator 274, water tank 275, cooling tower 276, and various pipes 281-287. Each asset may have an associated RFID tag 230. As shown in FIG. 2B, RFID tag 230 is depicted as including an antenna and a processor/memory. However, it may also be appreciated that RFID tag 230 can be any type of RFID tag. The RFID tag may store information about the asset, such as manufacturer's name, model number, specifications, three-dimensional CAD model, and the like. According to an embodiment, the RFID tags are attached to their respective items by their manufacturers, vendors, and the like, and are already in place when the plant was initially built. According to an embodiment of the invention, the value of the RFID tags is leveraged later during the lifecycle of the plant since a laser scanning process (or other suitable imaging process) can utilize the RFID tag information during subsequent inventory, service, upgrade, or other processes implemented during the life of the plant or building. For example, during an inspection, as the imaging tool images each asset, the RFID tag reader detects the RFID tag 230 associated with the respective asset and extract RFID data stored in the RFID tag 230, which can then be correlated with the images produced by the imaging tool.

According to an embodiment of the invention, central processor 210 automatically associates the RFID data with the imaging data acquired by the imaging tool without the intervention of an operator. According to another embodiment of the invention, the data integration process is performed semi-automatically. Merely by way of example, the hand-held device 101 may prompt an operator when one or more RFID tags are detected in a target area. The operator may select one of the one or more detected RFID tags as the RFID tag associated with a particular asset in the target area. The integrated RFID data and imaging data may be stored in a memory, which may be used later for asset management during the lifecycle of the plant.

Figure 3:
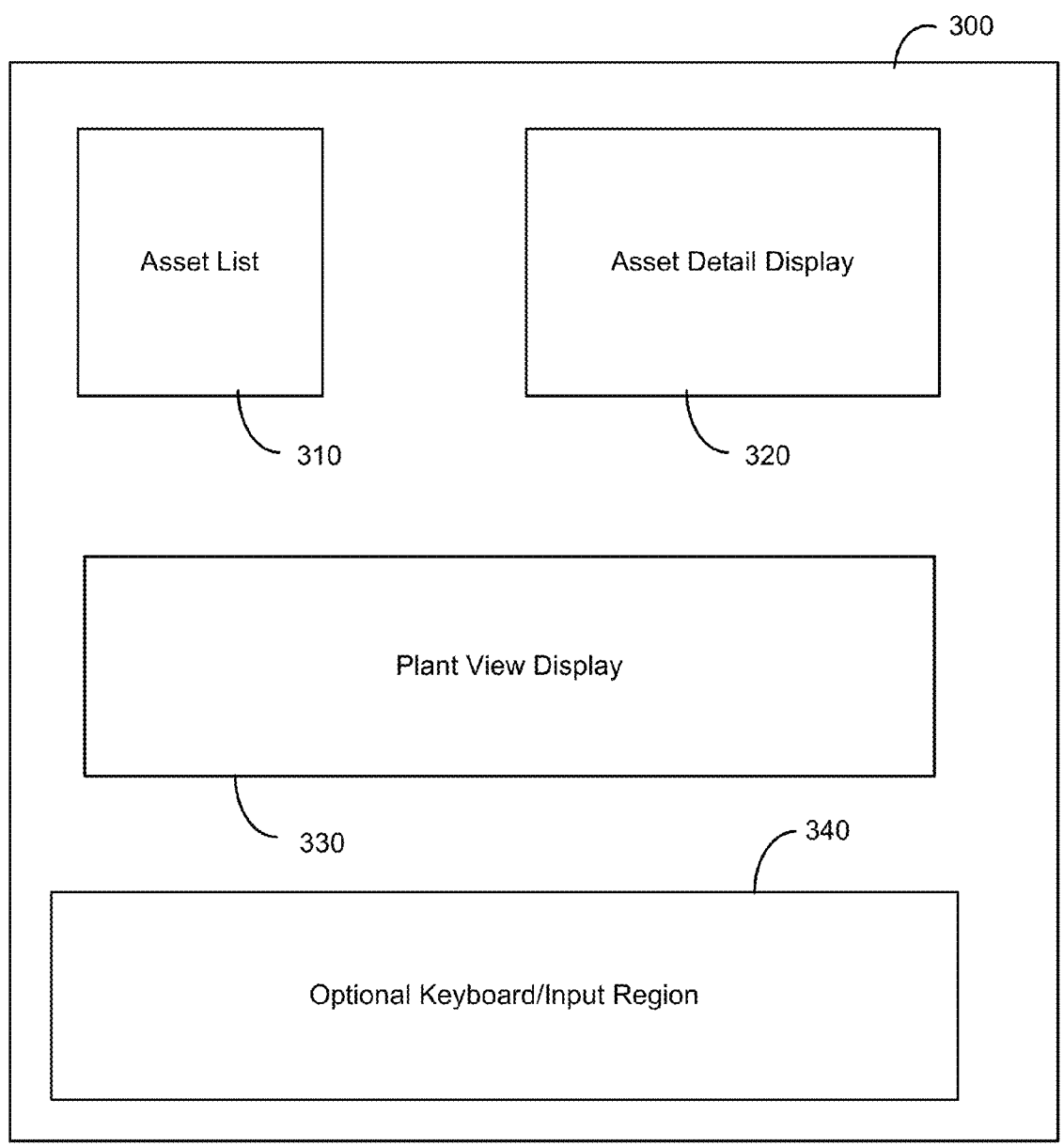
FIG. 3 is a simplified graphical user interface illustrating display of a visual representation of imaging data along with asset information according to an embodiment of the present invention.

FIG. 3 is a simplified graphical user interface illustrating display of a visual representation of imaging data along with asset information according to an embodiment of the present invention. The graphical user interface (GUI) 300 includes a plurality of regions or display tiles suitable for display (i.e., output) and/or entry (i.e., input) of data associated with the RFID-assisted imaging system and the assets being imaged and detected.

As an example of the use of the RFID-assisted imaging system, the GUI 300 is illustrated in the context of collection of integrated RFID data and imaging data for use in locating assets. Referring to FIG. 3, the GUI includes a first region 310 where an operator views a list of assets in the GUI. In FIG. 3, this first region is labeled as a Asset List area. The first region 310 can provide a functionality of not only displaying a list of the various assets, but may enable an operator to select a link associated with a particular asset, for example, using a touch screen, a cursor/trackpad, a keyboard, or other suitable input device. In response to the selection, a pop-up window may appear in a second region 320 of the GUI in order to show an image of the plant with the selected asset in the foreground. In FIG. 3, this pop-up window is illustrated as an Asset Detail Display area. In other embodiments, assets located during a scan can be automatically displayed in the Asset Detail Display area.

The GUI can also include a plant view region 330, which is used to display an image of the plant on the display. The image can be formed using images obtained using the imaging apparatus of the RFID-assisted imaging system, from a database either local or remote, combinations thereof, or the like. Thus, a plant equipment database could provide inputs for displaying a 2D or 3D view of the area of interest. As an example, information obtained using the RFID tags could be overlaid on the optical image shown on the display, with highlighting, images of the assets obtained using the system, images provided by the manufacturer, icons, asset identification numbers, asset descriptions, or the like. In an embodiment, the plant view region 330 is able to receive both input and display output, enabling an operator to select an object in the image of the plant. In response to selecting an object, the plant view region may display additional information including additional images of the object. Alternatively, the second region 320 of the GUI can be used to display additional information related to the object/asset, links to additional information related to the object, reference information about the selected asset, or the like. Such information may be used for repairing, replacing, or planning maintenance for the selected asset. The data related to the assets can be provided from a plurality of sources as will be evident to one of skill in the art. The user interface can be separated from the RFID-assisted imaging system, for example, on a computer in communication with the RFID-assisted imaging system, either in real time or by post-processing.

According to yet another embodiment of the invention, an image of the plant may be displayed along with a list of assets shown in the image. An operator may select a particular asset in the list. In response to the selection, a pop-up window may appear showing reference information about the selected asset. It should also be appreciated that the present invention is not limited to these particular embodiments. As illustrated in FIG. 3, an optional keyboard/input region 340 is provided in some embodiments to enable a system operator to provide inputs to the system. The arrangement of the various windows can be modified depending on the particular applications. One of ordinary skill in the art would recognize many variations, modifications, and alternatives.

According to another embodiment of the invention, the integrated RFID data and imaging data may be used for creating three-dimensional CAD models for a facility. While point clouds can be directly rendered and inspected, point clouds themselves are generally not directly usable in most three-dimensional applications, and therefore are often converted to CAD models that include parametric data for each part. For example, for the purpose of retrofitting or revamping the plant 270 illustrated in FIG. 2B, it may be desirable to convert point clouds of the plant into three-dimensional CAD models so that new parts may be designed to fit the existing parts. According to an embodiment of the invention, central processor 207 may use the RFID data to automatically or semi-automatically create three-dimensional CAD models of the plant 270, providing benefits not available when a mere 3D point cloud is available. CAD models provided by embodiments of the present invention are "intelligent" in the sense that, instead of merely representing the shape of an item, it contains parametric data about the item. For example, a CAD model of pipe 282 may include the outer and inner diameters of pipe 282. When pipe 282 needs to be retrofitted or replaced, a new pipe may be designed accurately based on the CAD model such that it will fit the other existing parts and will not cause interferences. According to an embodiment, CAD models may be overlaid with the corresponding point clouds in a display to assist a designer in designing replacement parts. Because data regarding various assets is included in the RFID tag, data provided by the RFID tag can be combined with imaging data of the asset can be leveraged to extend the point cloud to a CAD model.

According to an embodiment of the invention, an RFID tag may be imbedded in or associated with an optical marker and the information stored in the RFID tag may be used for identifying the optical marker. Three-dimensional imaging devices often use optical markers as reference points for alignment or registration in a three-dimensional pipeline process. An optical marker may be in the form of a marker ball, a piece of marker paper, a prism, a retro-reflector, permanent benchmarks, or other suitable optical element that is visible, in some embodiments, from at least two perspectives. Images taken from these two perspectives can then be used in conjunction with the optical markers to generate a 3D point cloud. An optical marker may also be an intrinsic reference point on an object, such as a sharp edge or a corner. Additional description related to co-location of RFID tags and optical markers and referencing of these elements to each other is provided in U.S. patent application Ser. Nos. 13/225,003 and 13/225,014, both filed on Sep. 2, 2011, the disclosures of which are hereby incorporated by reference in their entirety. Merely by way of example, the RFID tag can include reference information embedded in the RFID tag. As an example, such reference information could include "offset" information related to two or more locations or points. For example, the RFID tag could include information about the offset from the RFID tag to the optical marker. In some embodiments, the RFID tag can include reference information on more than one offset as appropriate to the particular application.

Alternatively, the offset embedded in the RFID tag could be the offset to another target of interest, which can act as a type of guide post or aid to finding the next position of interest. In this embodiment, the offset may direct the operator to the general area of an object using the reference information stored in the RFID tag, thereby serving as an aid in locating the subsequent position that is analyzed. One of ordinary skill in the art would recognize many variations, modifications, and alternatives.

Currently, optical markers are identified manually and information is then input into a software package for processing the scans to form a point cloud. According to an embodiment of the present invention, RFID-assisted imaging system 100 identifies an optical marker automatically based on the information stored in the embedded RFID tag. In cases where a site is scanned periodically, permanent markers embedded with or associated with RFID tags may be placed in specific locations on the site. Information stored in each RFID tag may specify the location of the respective permanent marker. In some embodiments utilizing one or more permanent markers in which scans happen periodically, the permanent optical marker can co-located with or associated with an RFID tag that includes information including the precise building location of the particular permanent marker, thereby facilitating the process of reassembling the images from the various perspectives to form the 3D point cloud.

According to another embodiment of the invention, RFID-assisted imaging system 100 may be used for multimodal location estimation. Commonly assigned U.S. patent application Ser. No. 13/225,003, filed on Sep. 2, 2011 describes a method of using an RFID tag reader to estimate the distance of an object and is hereby incorporated by reference in its entirety for all purposes. Most RFID tag readers can determine the distance from an RFID tag to their antennas rather accurately. However, RFID tag readers usually cannot determine angles of view with respect to their antennas with sufficient accuracy. On the other hand, imaging tools can determine angles of view with respect to their lenses accurately. Thus, by combining an RFID tag reader with an imaging tool, the location of an object may be accurately estimated. According to an embodiment, a unique identification of an object may be achieved based on the estimated location.

According to an embodiment of the invention, RFID-assisted imaging system 100 may achieve accurate identification of optical markers by using multimodal location estimation. According to an embodiment, the distance between an RFID-enhanced optical marker and an RFID tag reader may be estimated by utilizing phase information inherent in an RFID tag read and by reading at multiple frequencies. Meanwhile, the angle of view of the optical marker with respect to the imaging tool may be estimated by the imaging tool. Thus, the location of the optical marker may be determined with a predetermined accuracy. By advantageously placing various optical markers at different distances from the imaging tool and the RFID tag reader, each optical marker may be uniquely identified.

Figure 4:
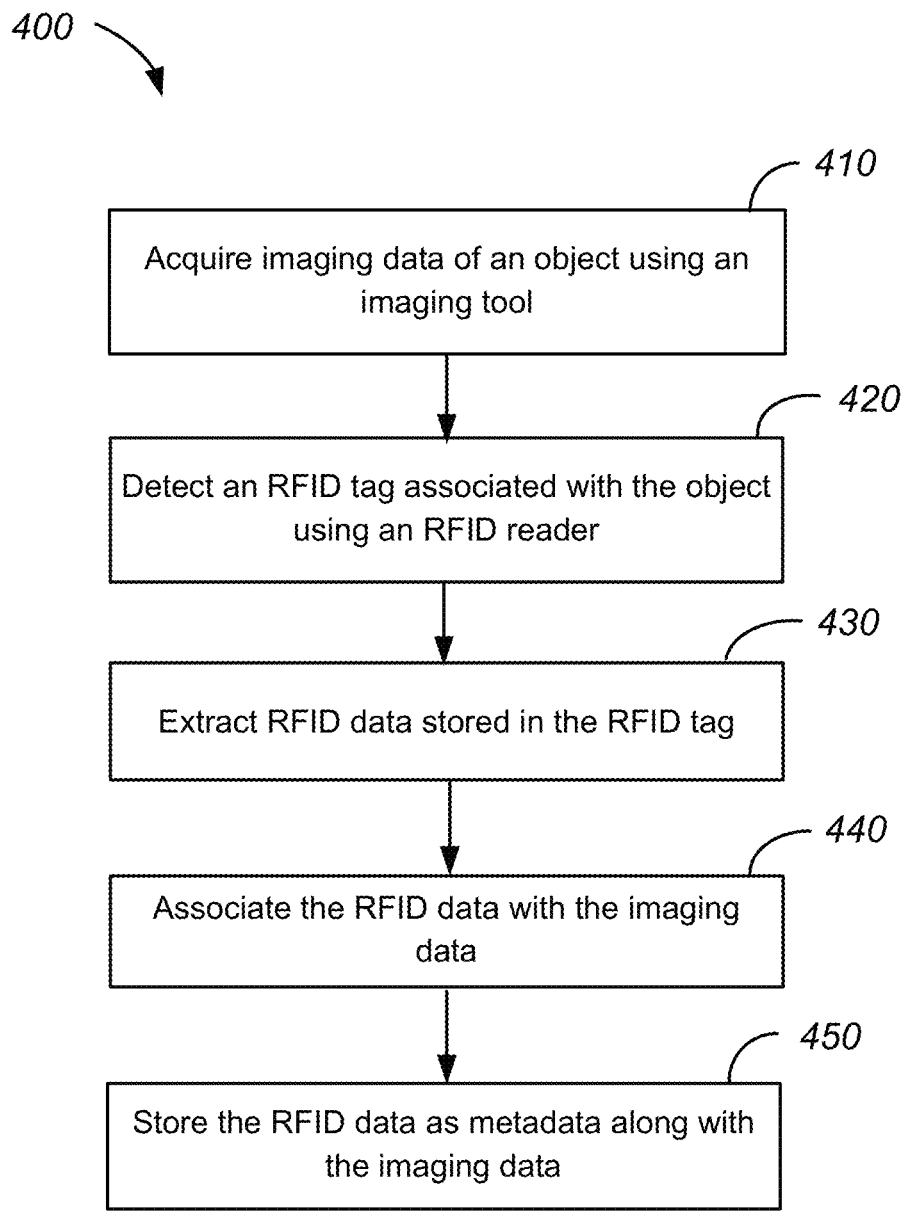
FIG. 4 is a simplified flowchart illustrating a method of RFID-assisted imaging according to an embodiment of the invention.

FIG. 4 is a simplified flowchart illustrating a method of performing RFID-assisted imaging according to an embodiment of the invention. The method 400 includes acquiring imaging data of an object using an imaging tool (410) and detecting an RFID tag associated with the object using an RFID reader (420). In an embodiment, the tool and the RFID reader are integrated in a single product that includes, for example, a camera and the RFID reader. Thus, in some embodiments, the RFID reader is co-located with the imaging tool. In some implementations, the imaging tool has a first field of view and the RFID reader has a second field of view that at least partially overlaps with the first field of view. In other embodiments, the field of views are the same. The method also includes extracting RFID data stored in the RFID tag (430) and associating the RFID data with the imaging data (440). The method further includes storing the RFID data as metadata along with the imaging data (450).

According to an embodiment, the method 400 further includes retrieving the RFID data in relation to the imaging data. According to embodiments of the invention, the method further includes varying the second field of view of the RFID reader, thereby facilitating a unique identification of the object. The second field of view of the RFID reader may be varied statically or dynamically. According to an embodiment, the imaging tool and the RFID reader reside in a handheld device.

According to an embodiment, the RFID tag is embedded in an optical marker and the
RFID data stored in the RFID tag includes an identification of the optical marker. In other embodiments, the RFID tag can be located at a predetermined distance from the optical marker. In these embodiments, the RFID tag can include data related to the distance and direction between the RFID tag and the optical marker. As an example of device operation, the imaging data can include two or more images of an object acquired from at least two different perspectives. Each of the two or more images would include the optical marker, enabling a correlation between the images to be performed. According to an embodiment, the method additionally includes identifying the optical marker using the RFID data, and creating a three-dimensional point cloud of the object from the two or more images using the optical marker as a reference point.

It should be appreciated that the specific steps illustrated in FIG. 4 provide a method of performing RFID-assisted imaging according to an embodiment of the invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
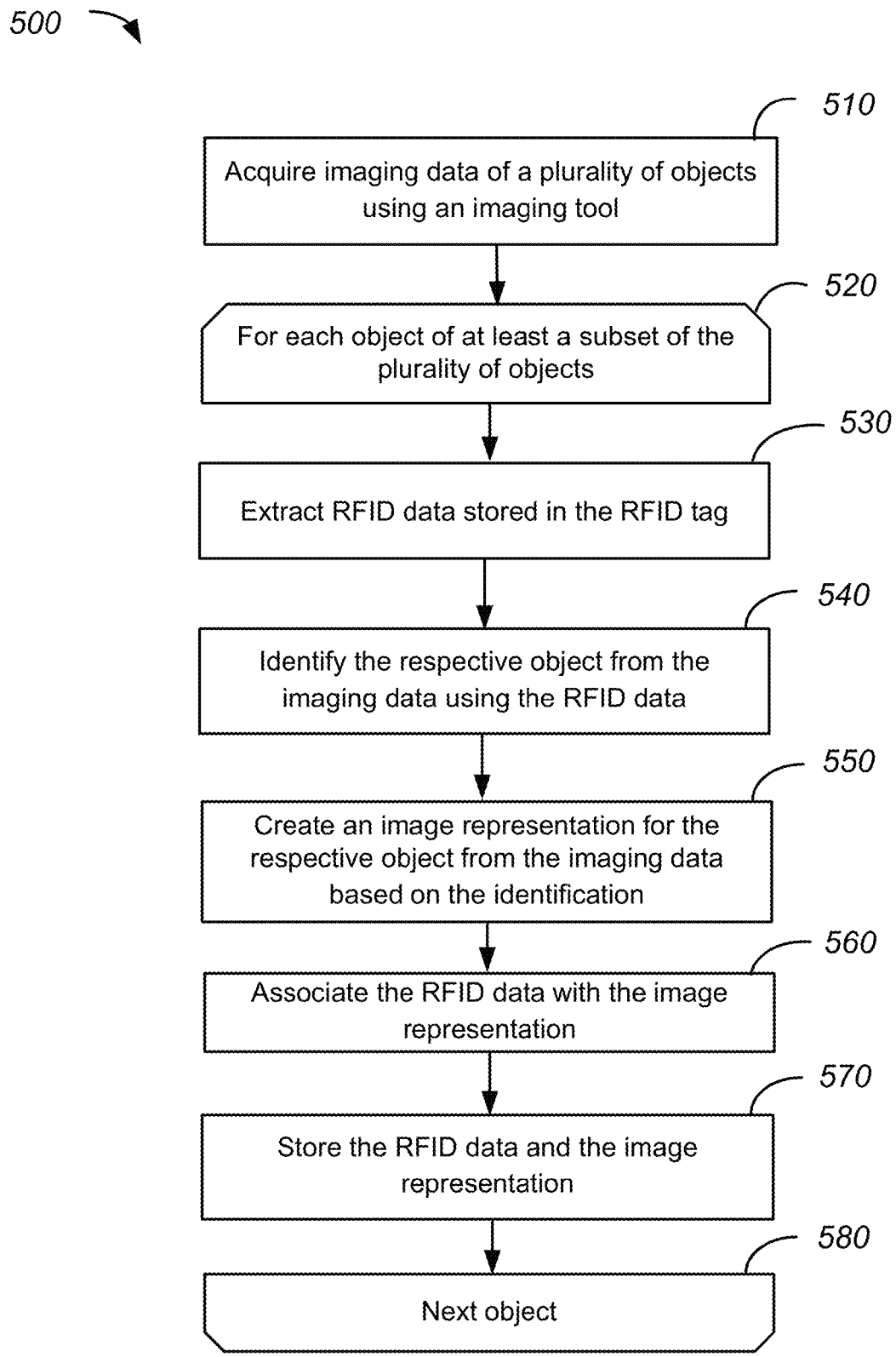
FIG. 5 is a simplified flowchart illustrating a method of collecting information according to an embodiment of the invention.

FIG. 5 is a simplified flowchart illustrating a method of collecting information according to an embodiment of the invention. The method 500 includes acquiring imaging data of a plurality of objects using an imaging tool (510). As an example, the plurality of objects can be assets in a factory, production facility, warehouse, or the like. The method also includes performing an iterative process for each object of at least a subset of the plurality of objects (520). For each object, the method includes detecting an RFID tag associated with the respective object (530) and extracting RFID data stored in the RFID tag (540).

The method further includes identifying the respective object from the imaging data using the RFID data (550), and creating a point cloud for the respective object from the imaging data based on the identification (560). The method additionally includes associating the RFID data with the point cloud (570) and storing the RFID data as metadata along with the point cloud (580). The method 500 then loops back (590) to process 520 in order to perform the iterative process for the next object of the subset of the plurality of objects.

According to an embodiment, the method includes receiving a search query related to a first object from the plurality of objects and identifying a matching point cloud from the stored point clouds using the stored RFID data. The method can include displaying a visual representation of the matching point cloud.

According to another embodiment, the method includes displaying a visual representation of one or more stored point clouds and identifying one or more objects corresponding to the one or more point clouds using the stored RFID data. In some implementations, the method can include displaying a list of the one or more identified objects along with the visual representation. The GUI illustrated in FIG. 3 can be utilized to display this information including the list of the one or more identified objects and the visual representation.

According to an embodiment, the method further includes receiving a user selection of one of the one or more identified objects in the list and, in response to receiving the user selection, retrieving the RFID data associated with the selected object and displaying at least a portion of the retrieved RFID data.

Utilizing embodiments of the present invention, the RFID data associated with the respective object includes an identification of the respective object, which can include a part number, serial number, manufacturing date, installation date, performance parameters, maintenance history, a geo-location of the object, or the like. The stored point clouds and the stored RFID data can be linked in a database, providing asset-based information that can be made available to an operator. The database can includes reference information related to each object of the subset of the plurality of objects. The reference information can be retrievable based on the identification of each object.

According to another embodiment, the RFID data includes reference information relevant to a stored CAD model (e.g., data related to a portion of a CAD model or an complete CAD model) of the respective object. In some embodiments, the method includes displaying a visual representation of one of more point clouds associated with one or more objects of the plurality of objects and storing reference information relevant to a stored CAD model. In an optional embodiment, the method can include retrieving one or more CAD models corresponding to the one or more objects and overlaying the one or more CAD models on the displayed visual representation of the one or more point clouds.

It should be appreciated that the specific steps illustrated in FIG. 5 provide a particular method of collecting information according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

In another embodiment of the present invention, a method of constructing a 3D point cloud is provided. The method includes obtaining a first image including at least a scene (e.g., a facility including a number of assets) from a first perspective. The first image includes an optical marker (e.g., a reference point). The method also includes receiving RFID data from an RFID tag associated with the optical marker and identifying a physical location associated with the optical marker using the RFID data. In an embodiment, each of the plurality of assets are associated with an RFID tag including information related each of the plurality of assets. As an example, equipment in a plant can have an RFID tag associated with the particular piece of equipment. Alternatively, a single RFID tag could be associated with a system including multiple assets, thereby providing information on components of the system with which the RFID tag is associated.

The method further includes obtaining a second image including at least the scene from a second perspective. The second image includes the optical marker. Additionally, the method includes constructing the 3D point cloud using the first image and the second image. Obtaining the first image and the second image can include the use of an imaging tool and receiving the RFID data can include the use of an RFID tag reader integrated with imaging tool. In other embodiments, the imaging tool and RFID tag reader are provided separately. The processes of obtaining images and RFID data can be performed concurrently or sequentially as appropriate to the particular implementation. The optical marker can be co-located with the RFID tag or the optical marker can be located a predetermined distance from the RFID tag, with the RFID tag including information related to the predetermined distance and/or a direction between the optical marker and the RFID tag.

In an embodiment, an optical marker is supplemented by using an RFID tag. As an example, an RFID tag could be used that references an optical structure (e.g., an optical marker, an edge of an object, a corner of an object, or the like). In this example, the RFID tag could be mounted on an object and reference a feature of the object that is useful in forming the 3D point cloud, for example, an end of a beam. The two images are captured so that the end of the beam is present in both images and the RFID data could be used to specify the use of the end of the beam in constructing the 3D point cloud. Thus, embodiments of the present invention provide accurate positioning using the optical systems in an information rich environment as a result of the incorporation of RFID tags and RFID data. Utilizing embodiments of the present invention, the RFID data can include the coordinates of an associated optical marker, enabling integration of this coordinate data with the imaging data.

Figure 6:
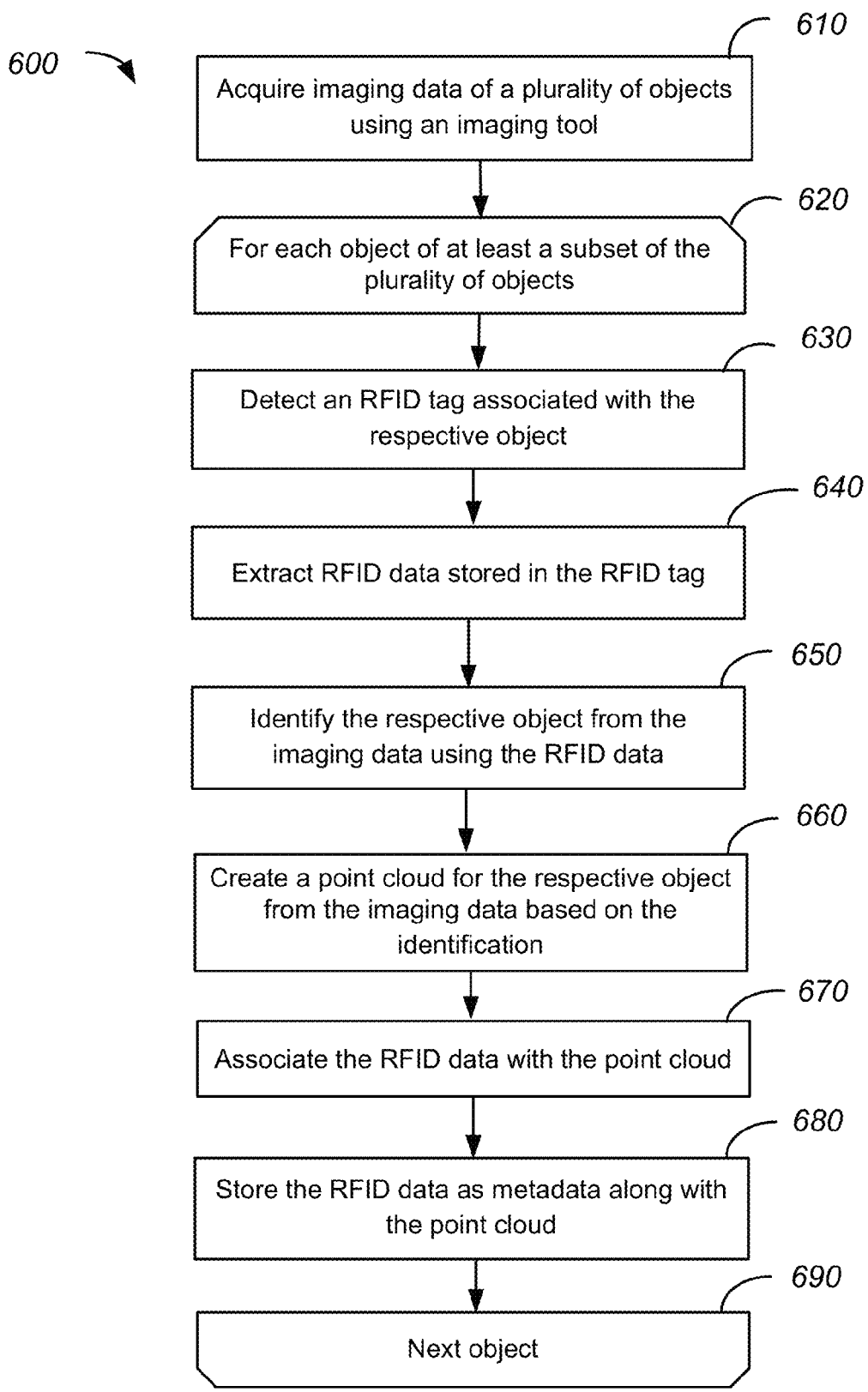
FIG. 6 is a simplified flowchart illustrating a method of managing RFID and imaging data according to an embodiment of the present invention.

FIG. 6 is a simplified flowchart illustrating a method of managing RFID and imaging data according to an embodiment of the present invention. The method 600 includes acquiring imaging data of a plurality of objects using an imaging tool (610). As an example, the plurality of objects can be assets in a factory, production facility, warehouse, or the like. The method also includes performing an iterative process for each object (i.e., a respective object) of at least a subset of the plurality of objects (620). For each object, the method includes detecting an RFID tag associated with the respective object and extracting RFID data stored in the RFID tag (630).

The method further includes identifying the respective object from the imaging data using the RFID data (640) and creating a point cloud for the respective object from the imaging data based on the identification (650). The method additionally includes associating the RFID data with the point cloud (660) and storing the RFID data as metadata along with the point cloud (670). The method 600 then loops back (680) to process 620 in order to perform the iterative process for the next object of the subset of the plurality of objects.

It should be appreciated that the specific steps illustrated in FIG. 6 provide a particular method of collecting information according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
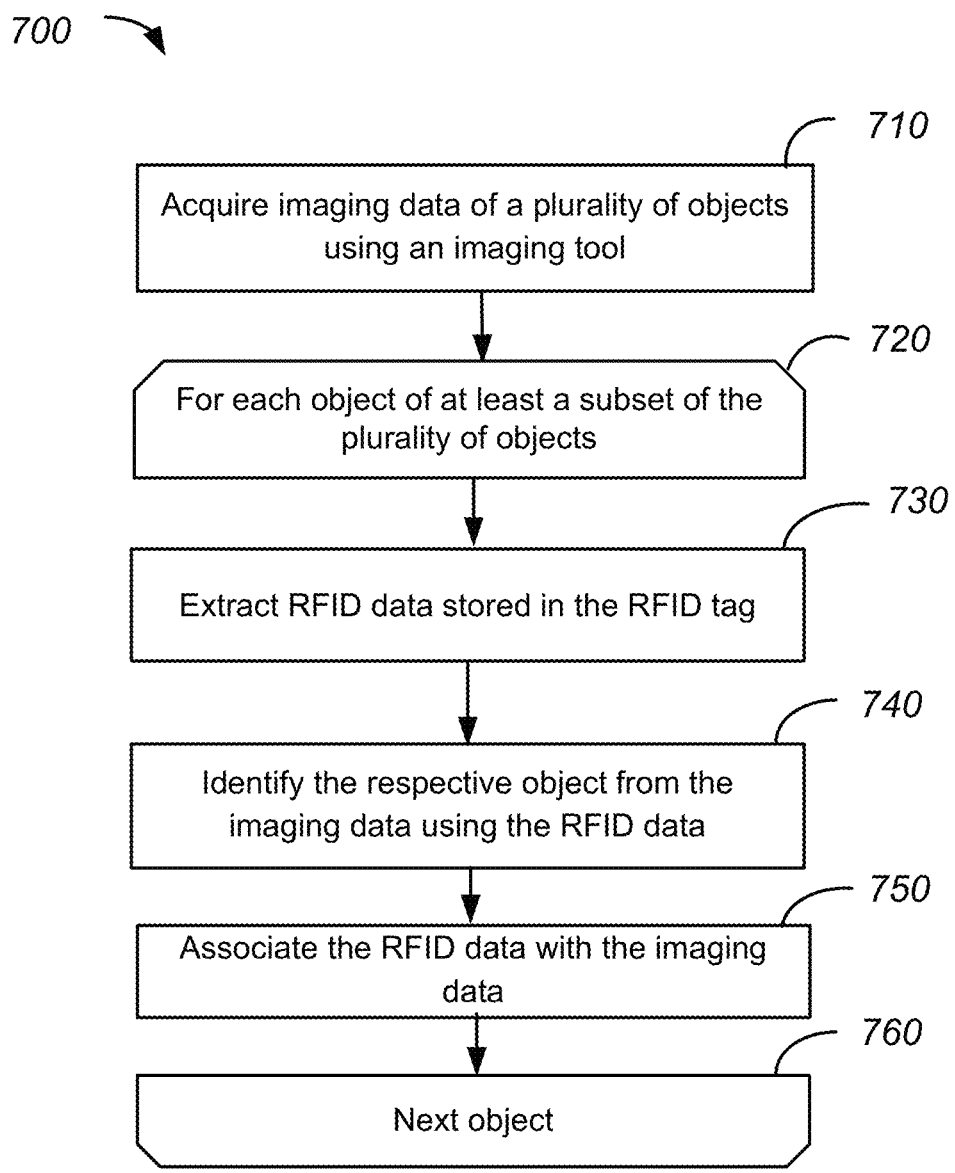
FIG. 7 is a simplified flowchart illustrating a method of collecting information according to another embodiment of the invention.

FIG. 7 is a simplified flowchart illustrating a method of collecting information according to another embodiment of the invention. The method 700 includes acquiring imaging data of a plurality of objects using an imaging tool (710). As an example, the plurality of objects can be assets in a factory, production facility, warehouse, or the like. The method also includes performing an iterative process for each object of at least a subset of the plurality of objects (720). For each object, the method includes extracting RFID data stored in the RFID tag (730).

The method further includes identifying the respective object from the imaging data using the RFID data (740), and associating the RFID data with the imaging data (750). The method 700 then loops back (760) to process 720 in order to perform the iterative process for the next object of the subset of the plurality of objects.

According to another embodiment, the method includes creating a point cloud and displaying a visual representation of the point cloud, which may be stored and identifying one or more objects corresponding to the point cloud using the RFID data. In some implementations, the method can include displaying a list of the one or more identified objects along with the visual representation. The GUI illustrated in FIG. 3 can be utilized to display this information including the list of the one or more identified objects and the visual representation.

Utilizing embodiments of the present invention, the RFID data associated with the respective object includes an identification of the respective object, which can include a part number, serial number, manufacturing date, installation date, performance parameters, maintenance history, a geo-location of the object, or the like. The stored point clouds and the stored RFID data can be linked in a database, providing asset-based information that can be made available to an operator. The database can includes reference information related to each object of the subset of the plurality of objects. The reference information can be retrievable based on the identification of each object.

It should be appreciated that the specific steps illustrated in FIG. 7 provide a particular method of collecting information according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners. The scope of the invention should, therefore, be determined with reference to the appended claims along with their full scope of equivalents.

What is claimed is:

1. A method comprising:
acquiring imaging data of a scene using an imaging tool, wherein an object is depicted within the scene;
processing the imaging data to create a three-dimensional representation of the scene, including a three-dimensional representation of the object;
extracting radio frequency identification (RFID) data stored in an RFID tag associated with the scene, wherein the RFID data comprises information that indicates what the object depicted within the scene is; and
associating the RFID data with the imaging data to identify a position of the object within the three-dimensional representation of the scene.

2. The method of claim 1 further comprising storing the RFID data and the imaging data.

3. The method of claim 2 wherein the RFID data is stored as metadata along with the imaging data.

4. The method of claim 1 wherein the imaging data is associated with one or more objects in the scene and the RFID tag is associated with at least one of the one or more objects.

5. The method of claim 1 wherein extracting RFID data comprises detecting the RFID tag using an RFID reader.

6. The method of claim 1 wherein acquiring imaging data and detecting the RFID tag are performed concurrently.

7. The method of claim 1 further comprising retrieving the RFID data in relation to the imaging data.

8. The method of claim 1 wherein the three-dimensional representation of the object is a point cloud representation of the object.

9. The method of claim 1 wherein the imaging tool comprises a time-of-flight laser rangefinder.

10. The method of claim 1 wherein the imaging tool comprises one or more cameras.

11. The method of claim 1 wherein the RFID reader is co-located with the imaging tool.

12. The method of claim 11 wherein the imaging tool has a first field of view, and the RFID reader has a second field of view, and wherein the second field of view at least partially overlaps with the first field of view.

13. The method of claim 12 further comprising varying the second field of view of the RFID reader, thereby facilitating a unique identification of the object.

14. The method of claim 13 wherein the second field of view of the RFID reader is varied statically or dynamically.

15. The method of claim 1 wherein the imaging tool and the RFID reader reside in a hand-held device.

16. The method of claim 1 wherein the imaging tool comprises a triangulation laser scanner.

17. The method of claim 1 wherein the RFID data includes reference information about the object.

18. The method of claim 1 wherein the RFID data includes a reference to a computer-added design (CAD) model of the object.

19. The method of claim 1 wherein the RFID tag is embedded in an optical marker, wherein:
   the optical marker is used as a reference point in creating the three-dimensional representation of the scene; and
   the RFID data stored in the RFID tag includes an identification of the optical marker.

20. The method of claim 19 wherein the imaging data include two or more images of the object acquired from at least two different perspectives, each of the two or more images including the optical marker, and the method further comprises:
   identifying the optical marker using the RFID data; and
   creating the three-dimensional representation of the object from the two or more images using the optical marker as the reference point.

21. The method of claim 20 further comprising, before identifying the optical marker:
   determining a distance from the RFID reader to the optical marker using the RFID reader;
   determining an angle of view of the optical marker with respect to the imaging tool using the imaging tool; and
   determining a location of the optical marker based on the determined distance using the RFID reader and the determined angle of view using the imaging tool.

22. A system comprising:
   an imaging tool operable to acquire imaging data of a scene, wherein:
      an object is depicted within the scene; and
      the imaging data is processed to create a three-dimensional representation of the scene, including a three-dimensional representation of the object; and
   an RFID reader operable to extract RFID data stored in an RFID tag associated with the scene, wherein:
      the RFID data comprises information that indicates what the object depicted within the scene is; and
      the RFID data is associated with the imaging data to identify a position of the object within the three-dimensional representation of the scene.

23. The system of claim 22 wherein the RFID reader is further operable to detect the RFID tag.

24. The system of claim 22 further comprising:
   a memory; and
   a processor operable to:
      associate the RFID data with the imaging data; and
      store the RFID data as metadata along with the imaging data in the memory.

25. The system of claim 24 wherein the three-dimensional representation of the scene is a 3D point cloud.

26. The system of claim 22 wherein the RFID data is associated with the imaging data and is retrievable via the association with the imaging data.

27. The system of claim 22 wherein the RFID data includes a metadata tag associated with the imaging data.

28. The system of claim 22 wherein the imaging data includes a point cloud representing the object.

29. The system of claim 22 wherein the imaging tool comprises a laser scanner using a time-of-flight laser rangefinder.

30. The system of claim 22 wherein the imaging tool comprises one or more cameras.

31. The system of claim 22 wherein the RFID reader and the imaging tool are co-located.

32. The system of claim 31 wherein the imaging tool has a first field of view, and the RFID reader has a second field of view, and wherein the second field of view at least partially overlaps with the first field of view.

33. The system of claim 32 wherein the second field of view of the RFID reader is statically or dynamically variable.

34. The system of claim 32 wherein the imaging tool comprises a triangulation laser scanner.

35. The system of claim 22 wherein the RFID data references a CAD model of the object.

36. The system of claim 22 wherein the RFID tag is embedded in an optical marker, wherein:
   the optical marker is used as a reference point in creating the three-dimensional representation of the scene; and
   the RFID data stored in the RFID tag includes an identification of the optical marker.

37. The system of claim 36 wherein the imaging data include two or more images of the object acquired from at least two different perspectives, each image including the optical marker, and a processor is configured to:
   identify the optical marker using the RFID data; and
   create a three-dimensional point cloud from the two or more images using the optical marker as a reference point.

38. The system of claim 36 wherein a processor is configured to determine a location of the optical marker by:
   determining a distance from the RFID reader to the optical marker using the RFID reader;
   determining an angle of view from the optical marker with respect to the imaging tool using the imaging data; and
   determining the location of the optical marker based on the determined distance from the RFID reader and the determined angle of view based on the imaging data.

39. A method of collecting information comprising;
   acquiring imaging data of a plurality of objects using an imaging tool;
   creating a three-dimensional representation of the plurality of objects based on the imaging data; and
   extracting RFID data stored in an RFID tag, wherein:
      the RFID data comprises, or comprises a reference to, a three-dimensional model;
      the three-dimensional model was created before acquiring the imaging data of the plurality of objects; and
      the three-dimensional model is a representation of at least one object of the plurality of objects.

40. The method of claim 39 further comprising storing the RFID data and the three-dimensional representation.

41. The method of claim 39 further comprising identifying the at least one object using the RFID data.

42. The method of claim 39 further comprising detecting the RFID tag prior to extracting RFID data stored in the RFID tag.

43. The method of claim 39 wherein the three-dimensional model comprises a point cloud.

44. The method of claim 43 further comprising:
receiving a search query related to the at least one object;
identifying the three-dimensional model of the at least one object using the stored RFID data, wherein the three-dimensional model was created before acquiring the imaging data; and
displaying the three-dimensional model of the at least one object.

45. The method of claim 39 wherein the RFID data further includes reference information for the at least one object.

46. The method of claim 44 wherein the search query includes an identification of the at least one object.

47. The method of claim 44 wherein the search query comprises a link provided on a user interface.

48. The method of claim 39 further comprising:
displaying the three-dimensional representation of the plurality of objects;
identifying the at least one object using the stored RFID data; and
displaying a list comprising the at least one object along with the three-dimensional representation of the plurality of objects.

49. The method of claim 48 further comprising:
receiving a user selection of the at least one object in the list; and
in response to receiving the user selection:
retrieving the RFID data associated with the at least one object; and
displaying at least a portion of the retrieved RFID data.

50. The method of claim 48 wherein:
additional RFID data is extracted from a plurality of RFID tags, the plurality of RFID tags comprising the RFID tag,
the additional RFID data identifies objects in a subset of the plurality of objects, and
the method further comprises linking the subset of the plurality of objects and the additional RFID data with a database, wherein the database includes reference information related to each object of the subset of the plurality of objects.

51. The method of claim 50 further comprising:
receiving a user selection of an object of the subset of the plurality of objects; and
in response to receiving the user selection:
retrieving reference information from the database based on the user selection; and
displaying at least a portion of the reference information retrieved from the database.

52. The method of claim 51 wherein the reference information includes lifecycle information of the selected object.

53. The method of claim 39 wherein the three-dimensional model is a CAD model of the at least one object, and the method further comprises:
displaying the three-dimensional representation of the plurality of objects;
retrieving the CAD model corresponding to the at least one object; and
overlaying the CAD model on the displayed three-dimensional representation of the plurality of objects.

54. A method of constructing a 3D point cloud, the method comprising:
obtaining a first image including at least a scene from a first perspective, wherein the first image includes an optical marker;
receiving RFID data stored on an RFID tag associated with the optical marker;
identifying a physical location of the optical marker using the RFID data stored on the RFID tag;
obtaining a second image including at least the scene from a second perspective, wherein the second image includes the optical marker; and
constructing the 3D point cloud using the first image, the second image, and the optical marker as a reference point in both the first image and the second image.

55. The method of claim 54 wherein obtaining the first image and the second image comprises using an imaging tool and receiving RFID data comprises using an RFID tag reader integrated with the imaging tool.

56. The method of claim 54 wherein the scene comprises a plurality of assets.

57. The method of claim 56 wherein each of the plurality of assets are associated with an RFID tag including information related each of the plurality of assets.

58. The method of claim 54 wherein the optical marker is co-located with the RFID tag.

59. The method of claim 54 wherein the optical marker is located a predetermined distance from the RFID tag and the RFID tag includes information related to the predetermined distance.

* * * * *